Dec. 26, 1933.    J. PEYSER    1,941,153
BODY SEPARATING AND SPACING DEVICE
Filed Dec. 23, 1931
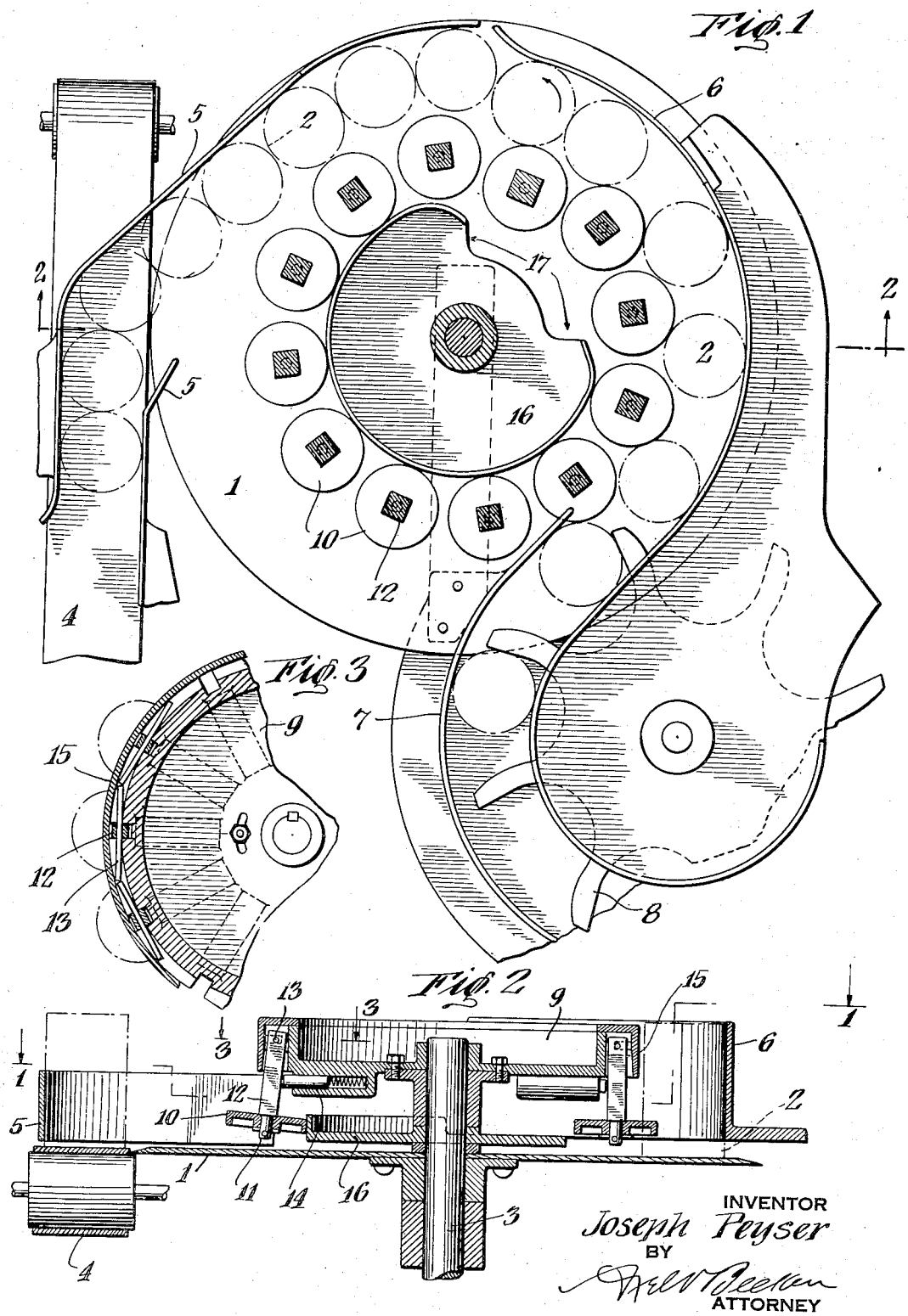
INVENTOR
Joseph Peyser
BY
ATTORNEY Patented Dec. 26, 1933

1,941,153

UNITED STATES PATENT OFFICE 1,941,153

BODY SEPARATING AND SPACING DEVICE

Joseph Peyser, Mount Vernon, N. Y., assignor of one-half to the Heekin Can Company, Cincinnati, Ohio, a corporation of Ohio Application December 23, 1931
Serial No. 582,751

4 Claims. (Cl. 198—22)

The present invention relates to body separating devices more particularly but not exclusively for use in connection with machines for seaming filled cans or bodies.

The main object and feature of the invention is to provide simple and inexpensive means for effectively separating bodies or containers so as to space them properly for introduction into a seaming machine or the like and to do so without unduly jarring said containers.

In the accompanying drawing the invention is disclosed in a concrete and preferred form in which:

Fig. 1 is a horizontal sectional view substantially on the plane of line 1—1 of Fig. 2 and showing a device embodying the invention;

Fig. 2 is a vertical sectional view substantially on the plane of line 2—2 of Fig. 1; and Fig. 3 is a detail sectional view substantially on the plane of line 3—3 of Fig. 2.

1 indicates a movable support to advance bodies 2, said support here taking the form of a rotatable dial mounted on rotating shaft 3. The bodies may be fed by hand or otherwise such as by conveyor 4 to said dial, in which case there may be suitable deflecting guides 5 to direct the bodies to pass to the dial at the infeeding point thereof. Adjacent one side of the bodies, here circumferentially of the dial, is a guide 6 which is substantially concentric with the center of rotation of the dial throughout the greater part of its length and until the delivery point is reached where it bears off and cooperates with another guide 7 to direct the bodies away from the dial. A rotatable star wheel 8 is located adjacent the delivery point to engage the now spaced containers or bodies and to deliver them through the channel formed by guides 6 and 7 for subsequent operation.

Carried by and rotating with shaft 3 is a head 9 and mounted on this head is a plurality of members, here rollers 10, which thus have a movement of translation in the same direction as the movement of the dial. Each roller is rotatable about its own axis by reason of the fact that it is mounted on a pintle 11 carried by an arm 12 pivotally supported at 13. Associated with each arm is a spring-pressed plunger 14 that urges the roller toward a body. Thus there is provided means to yieldingly urge the rollers individually toward the bodies and thereby the latter toward the circumferential guide. It will be observed, however, that outward radial movement of arm 12 is limited by wall 15 of the head. Means are further provided to render the rollers unyielding with respect to the bodies adjacent the infeed and delivery points of the dial, and in the present instance such means consist of a mutilated cam or guide 16 for said rollers. Said cam 16 is stationary and extends approximately from the delivery point to the infeed point of the dial, but has a mutilated portion 17 intermediate the infeed and delivery points of the dial.

The bodies usually come from a machine that feeds them at a rather rapid rate so that there is considerable pressure exerted on the line of bodies, and the effect of the rollers which are held rigidly in an outward direction to the full extent of their outward movement at the infeed point of the dial is to oppose this pressure so as to arrange the bodies in a single file and thus prevent subsequent overcrowding. It will be seen, however, that as soon as a roller reaches the mutilated portion of the cam it can yield inwardly or move outwardly under compulsion of its spring-pressed plunger and therefore virtually becomes an independent and self-adjusting unit. The effect of a roller therefore is to yieldingly press a body against the circumferential guide and in so doing to cause a rotation of said body which moves it backward until a roller has passed beyond the body, whereby the bodies are properly spaced without undue jarring or sudden movements. As the body approaches the delivery point, the roller which controls it again becomes rigid or unyielding, and that may be done because the body has now been properly spaced and is ready to be presented to the star wheel for delivery.

I claim:

1. A device for separating bodies including: a rotatable dial to advance the bodies; a guide adjacent the outer circumference of said dial; a plurality of members, having a movement of translation in the same direction as the movement of the dial, in spaced relation to the guide to engage the bodies and hold them against the guide; yielding means to urge said members individually toward the bodies to thereby space said bodies with respect to each other; and means to render said members unyielding with respect to the bodies adjacent the point where the bodies are placed on the dial to thereby bring said bodies into single file before spacing them with respect to each other.

2. A device for separating bodies including: a guide adjacent the outer circumference of said dial; a plurality of rotatable rollers, having a movement of translation in the same direction as the movement of the dial, in spaced relation to the guide to engage the bodies and hold them against the guide; yielding means to urge said rollers individually toward the bodies to thereby space said bodies with respect to each other; and means to render said rollers unyielding with respect to the bodies adjacent the point where the bodies are placed on the dial to thereby bring said bodies into single file before spacing them with respect to each other.

3. A device for separating bodies including: a rotatable dial to advance the bodies; a guide adjacent the outer circumference of said dial; a plurality of members, having a movement of translation in the same direction as the movement of the dial, in spaced relation to the guide to engage the bodies and hold them against the guide, yielding means to urge said members individually toward the bodies, and means to render said members unyielding with respect to the bodies adjacent the infeed and delivery points of the dial.

4. A device for separating bodies including: a rotatable dial to advance the bodies; a guide adjacent the outer circumference of said dial; a plurality of rotatable rollers, having a movement of translation in the same direction as the movement of the dial, in spaced relation to the guide to engage the bodies and hold them against the guide; yielding means to urge said rollers individually toward the bodies; and means to render said rollers unyielding with respect to the bodies adjacent the infeed and delivery points of the dial.

JOSEPH PEYSER.